United States Patent
Aono et al.

[11] Patent Number: 6,128,344
[45] Date of Patent: Oct. 3, 2000

[54] IMAGE CODING/DECODING APPARATUS UTILIZING SUB-BAND ENCODING

[75] Inventors: Tomoko Aono; Hiroyuki Katata; Norio Ito; Hiroshi Kusao, all of Chiba, Japan

[73] Assignee: Sharp Kabushiki Kaisha, Osaka, Japan

[21] Appl. No.: 09/293,846

[22] Filed: Apr. 19, 1999

Related U.S. Application Data

[62] Division of application No. 08/736,284, Oct. 24, 1996, Pat. No. 5,929,912.

[30] Foreign Application Priority Data

Oct. 24, 1995 [JP] Japan .................................. 7-275500

[51] Int. Cl.[7] .................................................... H04N 7/32
[52] U.S. Cl. .................................. 375/240.11; 375/240.25
[58] Field of Search .............................. 341/67; 348/390, 348/397–403, 405, 407, 409–413, 415, 416, 420, 699; 382/232, 233, 236, 238, 248, 251, 300; 375/240, 240.11, 240.25; H04N 7/30, 7/32

[56] References Cited

U.S. PATENT DOCUMENTS

| | | |
|---|---|---|
| 4,969,040 | 11/1990 | Gharavi . |
| 5,128,757 | 7/1992 | Citta et al. . |
| 5,337,085 | 8/1994 | Lee et al. . |
| 5,459,514 | 10/1995 | Sakamoto et al. . |
| 5,491,523 | 2/1996 | Sato . |
| 5,631,644 | 5/1997 | Katata et al. ............................. 341/67 |
| 5,633,684 | 5/1997 | Teranishi et al. . |
| 5,832,143 | 11/1998 | Suga et al. ............................... 382/300 |
| 5,896,176 | 4/1999 | Das et al. ................................. 348/416 |
| 5,982,435 | 11/1999 | Tong et al. ............................... 348/398 |
| 6,023,299 | 2/2000 | Katata et al. ............................ 348/397 |
| 6,023,301 | 2/2000 | Katata et al. ............................ 348/390 |
| 6,052,417 | 2/2000 | Fujiwara et al. ......................... 348/409 |

FOREIGN PATENT DOCUMENTS

| | | |
|---|---|---|
| 62-51148A | 9/1994 | Japan . |
| 6-350989A | 12/1994 | Japan . |

OTHER PUBLICATIONS

Tetsurou Fujii et al., Topics on Wavelet Transform (5), IEICE Technical Report (IE92–11), vol. 92, No. 19, (Apr. 1992).

Takashi Nishimura et al., Real–Time Auto Face–Tracking System, A Study Report 93–04–04 (Nov. 1993).

Jerome M. Shapiro, "Embedded Image Coding Using Zerotrees of Wavelet Coefficients", IEEE Transactions on Signal Processing, vol. 41, No. 12 (Dec. 1993).

Primary Examiner—Richard Lee

[57] ABSTRACT

An image coding/decoding apparatus offers a visually high quality image at a very low bit rate. The image is divided into images for individual regions using its shape information. Each region is made into rectangle blocks by an extrapolation process, whereby each region can be sub-band coded. Finally, multiple extrapolated images which were formed by the extrapolating process, are appropriately coded or quantized.

10 Claims, 16 Drawing Sheets

FIG. 4 PRIOR ART
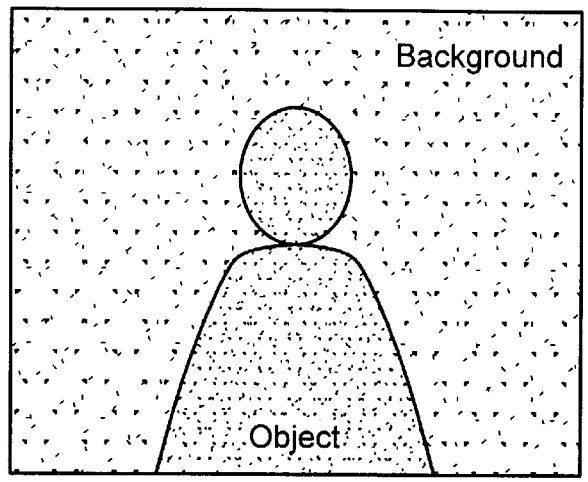
FIG. 5 PRIOR ART
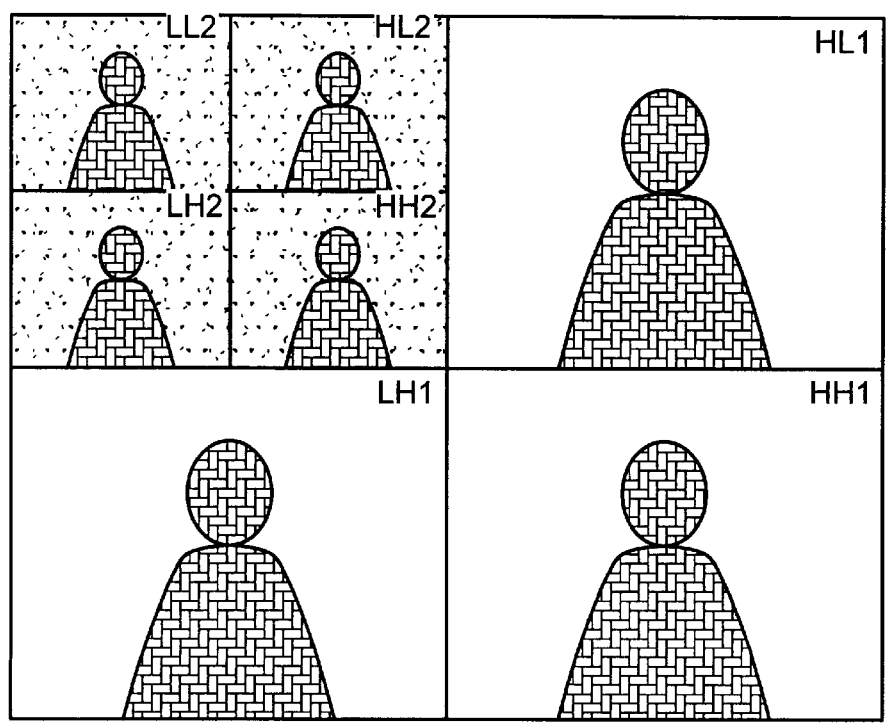
 Fine quantization
 Rough quantization
 Quantized value = 0

FIG. 6
PRIOR ART
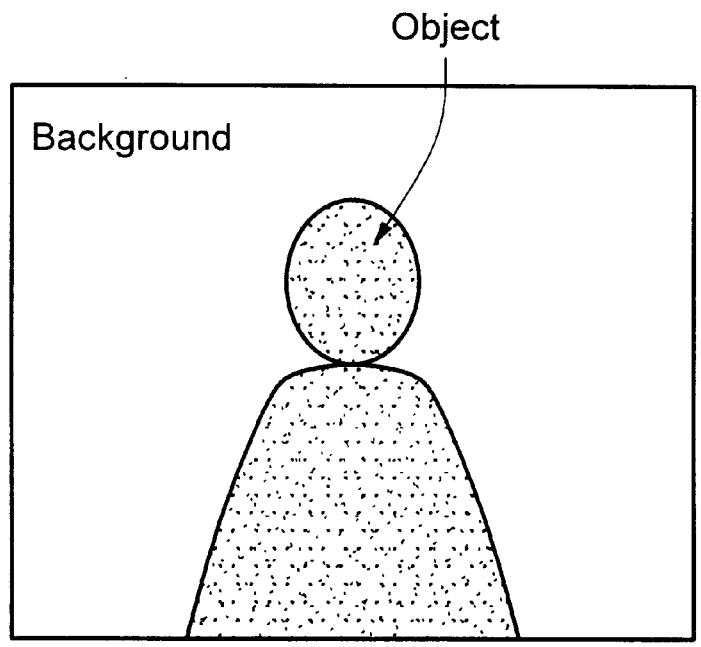
(a) Original image
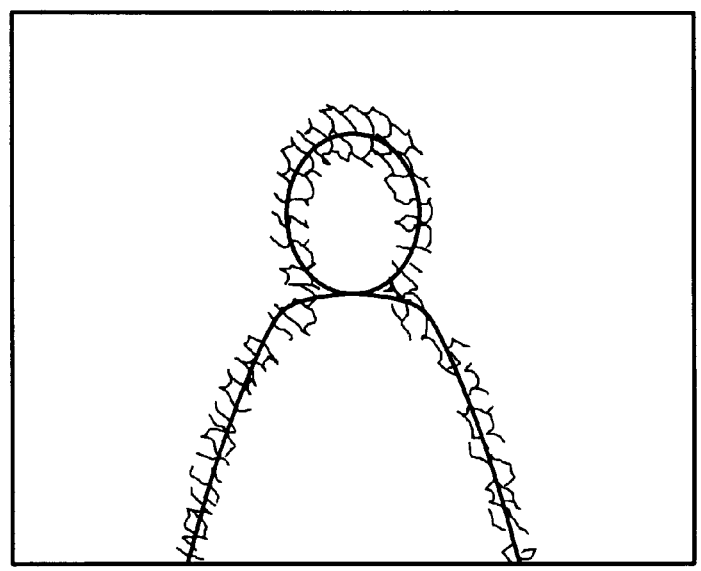
(b) Generation of deformation

FIG. 8(a)

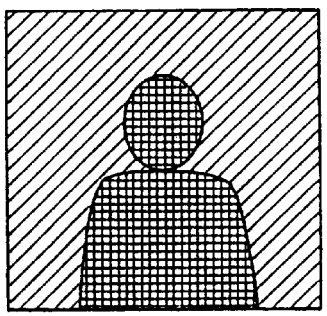

Original image

FIG. 8(b)

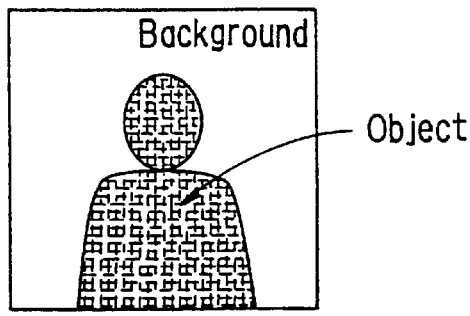

Shape information

FIG. 8(c)

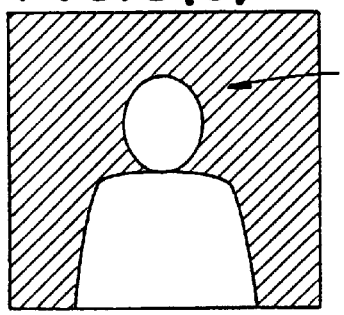

Extracted data of the background region

FIG. 8(d)

Image in the background of the original image

Image in the background of the original image

Extrapolation to the region other than the background

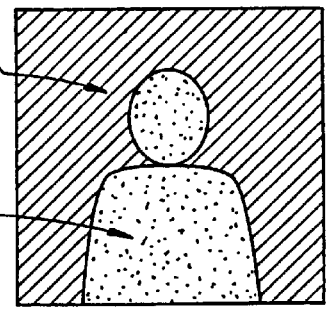

Extrapolated image for the background

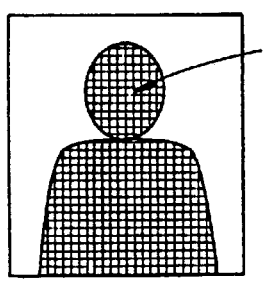

Image in the object of the original image

Image in the object of the original image

Extrapolation to the region other than the object

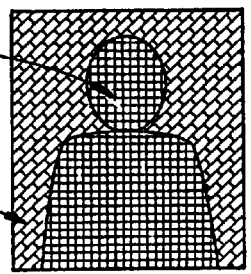

Extracted data of the object region

Extrapolated image for the object

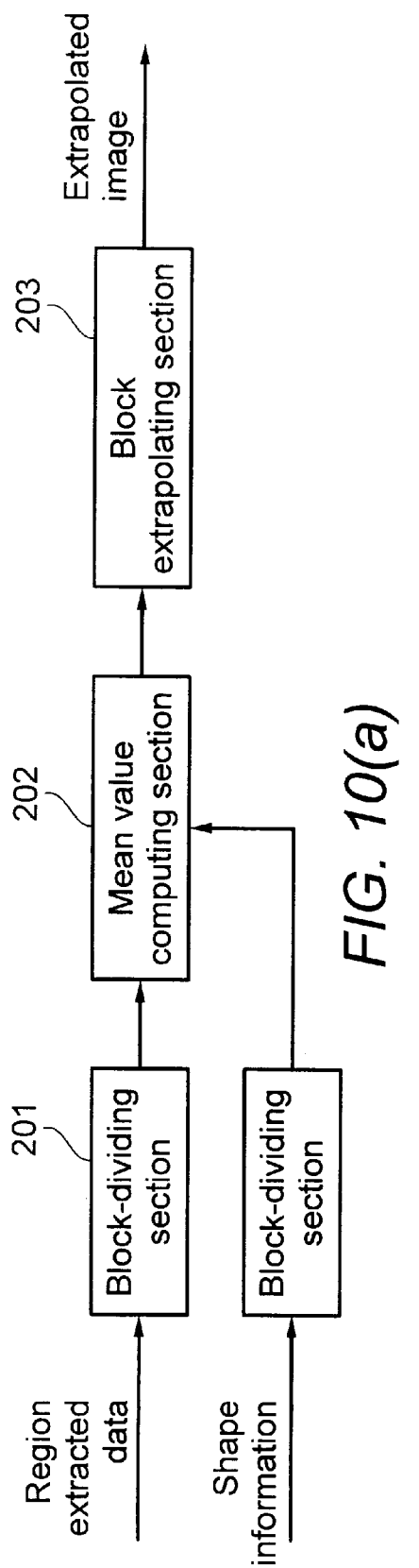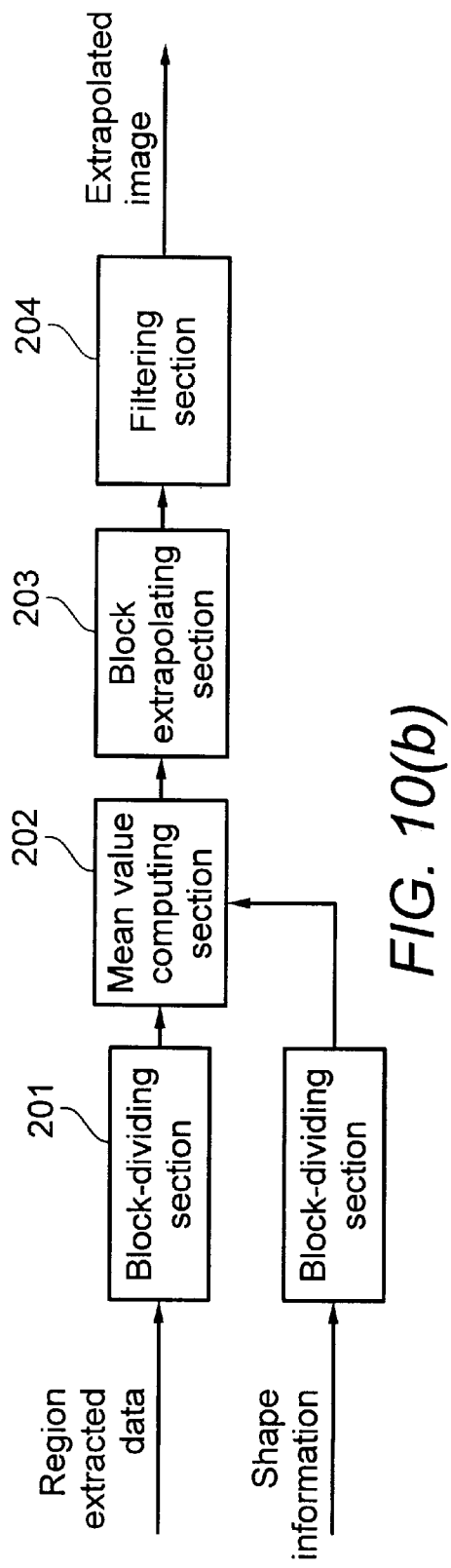
FIG. 10(a)
FIG. 10(b)

FIG. 11(a)
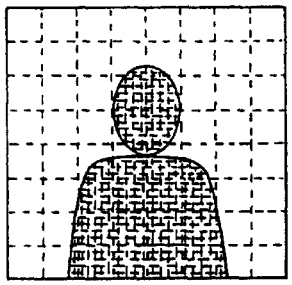
Shape information
FIG. 11(b)
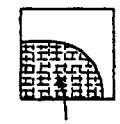
Object shape information
FIG. 11(c)
Mean pixel value of the object
FIG. 11(d)
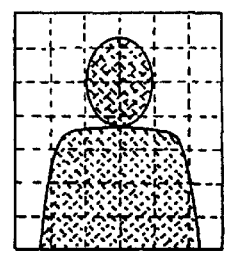
Region extracted data
FIG. 12(a)
Original image of the object
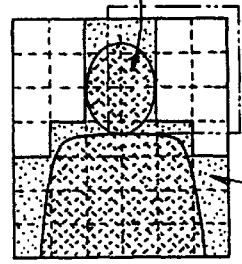
Region extracted data
Block after mean value process
FIG. 12(b)
Block after mean value process
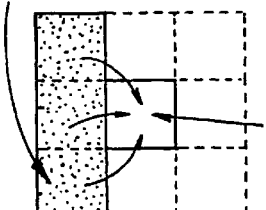
Observed block

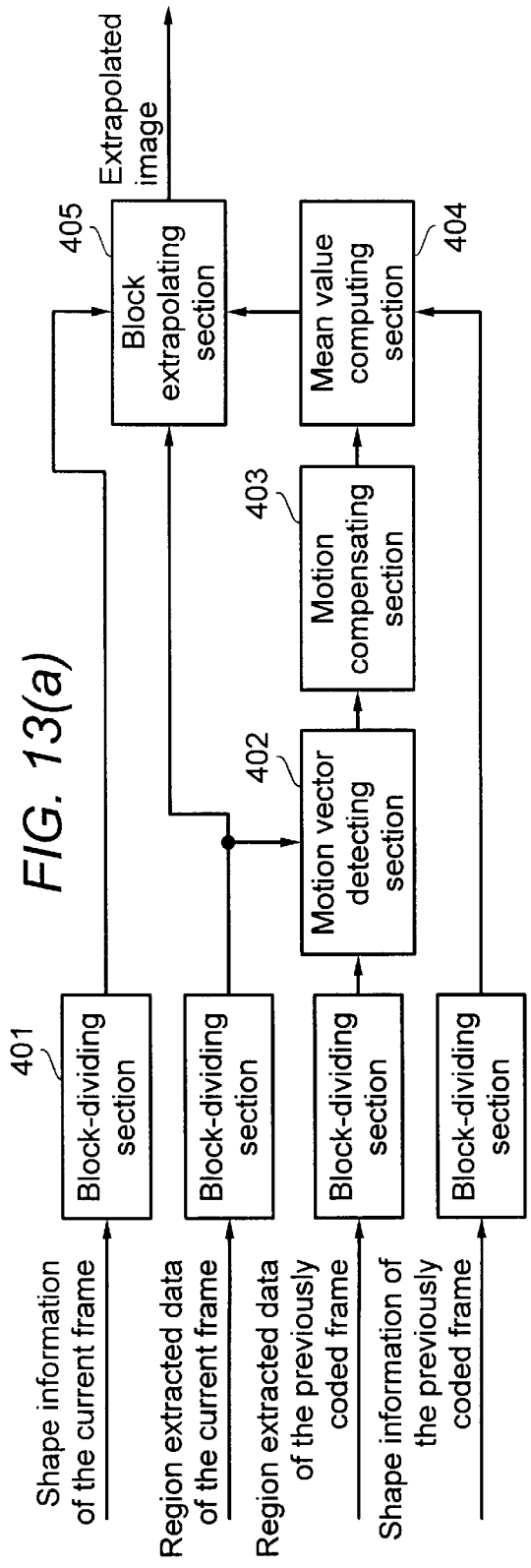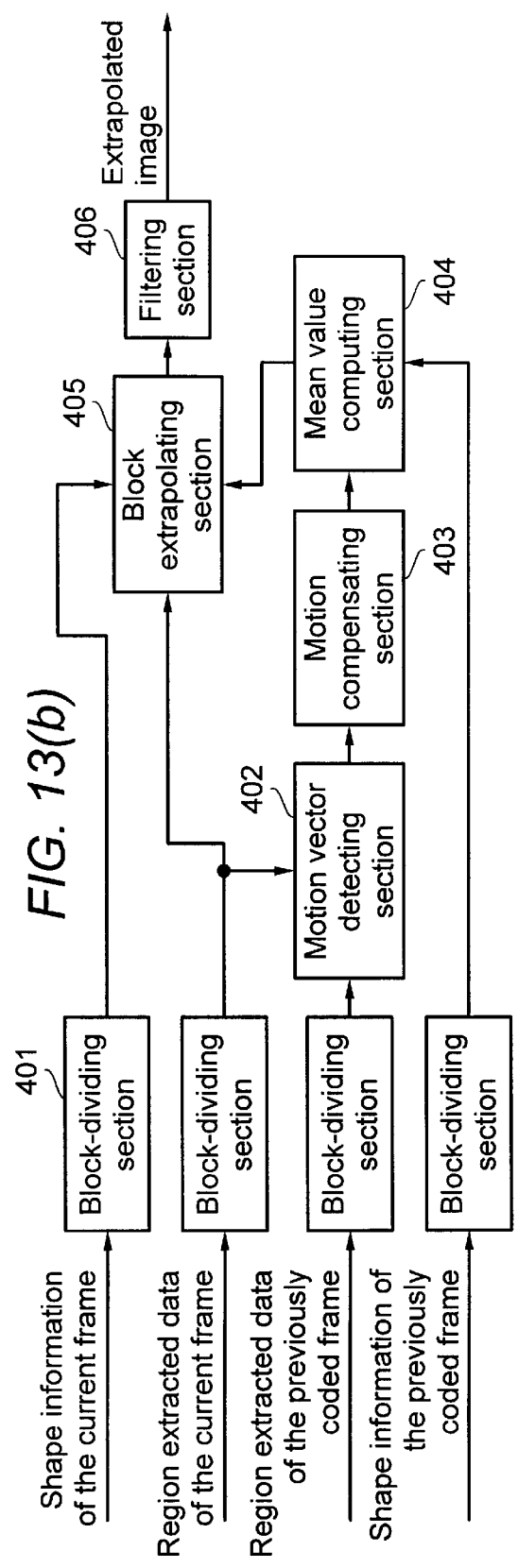

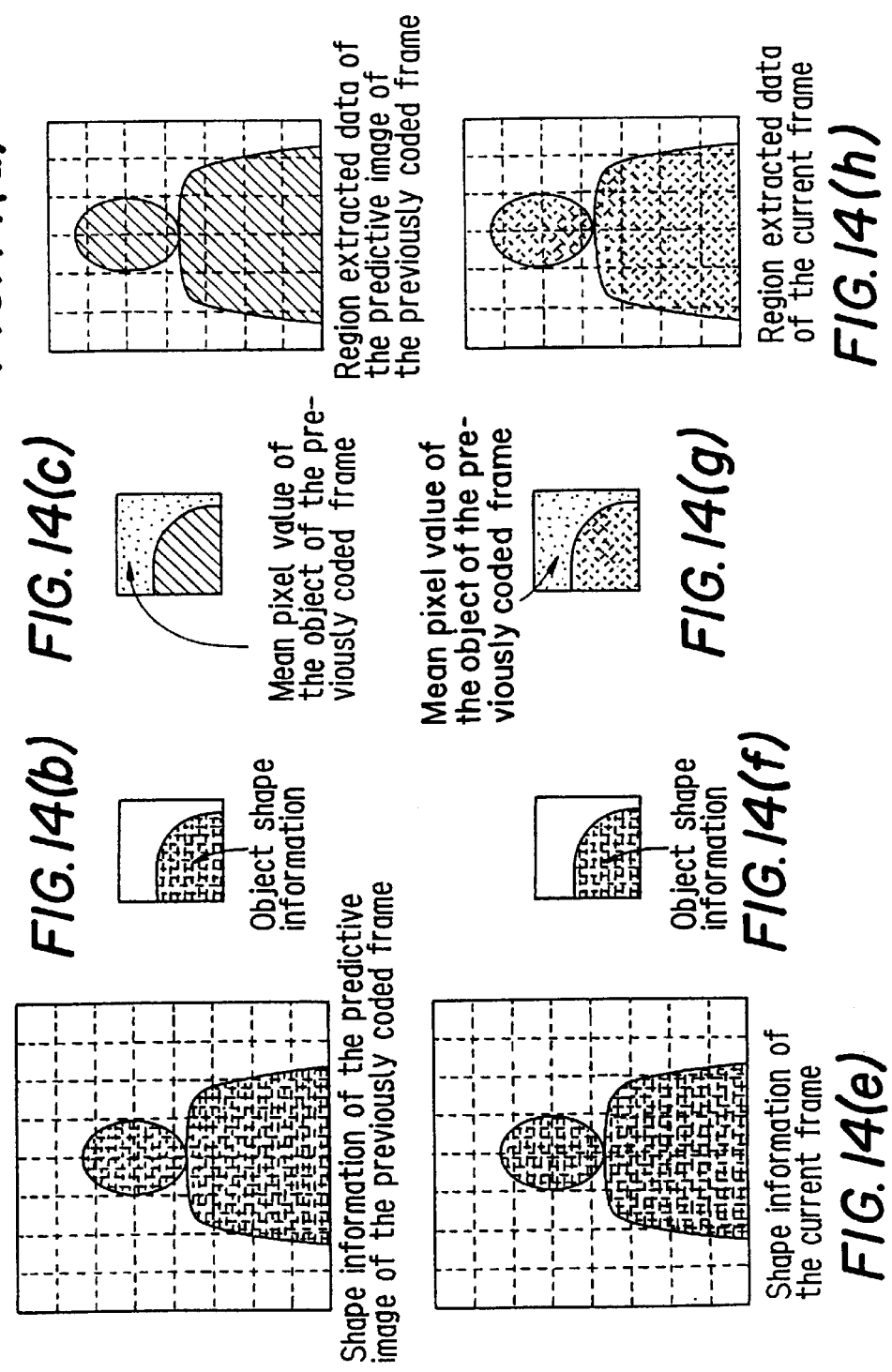

IMAGE CODING/DECODING APPARATUS UTILIZING SUB-BAND ENCODING

This application is a divisional of application Ser. No. 08/736,284, filed on Oct. 24, 1996, now U.S. Pat. No. 5,929,912, the entire contents of which are hereby incorporated by reference.

BACKGROUND OF THE INVENTION (1) Field of the Invention

The present invention relates to a digital image process, and is preferably directed to an image coding/decoding apparatus. The image coding apparatus which encodes image data at high efficiency and the image decoding apparatus preferably decodes the data encoded by the image coding apparatus.

(2) Disclosure of the Prior Art

In recent years, sub-band coding schemes have been proposed as the schemes for high-efficiency coding and decoding of images. Other than the sub-band coding schemes, block transform coding typically represented by discrete cosine transforms has been used as the scheme for high-efficiency coding and decoding of images. In block transform coding, an image is divided into blocks and each block is processed separately, by itself. This method has a problem in that block distortion occurs at block boundaries with neighboring blocks. In contrast to this, sub-band coding is an overlapping block transform, that is, the neighboring blocks overlap each other so that no block distortion occurs. This is known to be especially effective in image coding at low bit rates.

Typical sub-band coding schemes, a scheme in which the input image is analyzed through a sub-band filter bank to perform sub-band decomposition as shown in FIG. 1, are generally known as coding schemes of high efficiency. This is described in, for example, 'Topics on Wavelet Transform' by Fujii and Nomura, IEICE Technical Report IE92-11 (1992).

FIG. 1 shows a result which was obtained by subjecting the input image signal to two levels of two-dimensional sub-band decomposition: HL1 represents a sub-band of high frequencies in the horizontal direction and low frequencies in the vertical direction; LH1 represents a sub-band of low frequencies in the horizontal direction and high frequencies in the vertical direction; and HH1 represents a sub-band of high-frequencies in the horizontal direction and high frequencies in the vertical direction. The region of low frequencies in the horizontal direction and low frequencies in the vertical direction, is further two-dimensionally divided into sub-bands to obtain band HL2, LH2, HH2, in a similar manner as above. In this case, LL2 represents a sub-band of low frequencies in the horizontal direction and low frequencies in the vertical direction. For the filter bank for sub-band decomposition, a filter bank for wavelet transform, a filter bank for sub-band decomposition/composition, or the like, can be used.

The image signal divided as in FIG. 1 has a hierarchical structure, and it is possible to change the bit allocation pixel to pixel for specified regions in accordance with the shape information which will be described later. In this way, the high-efficiency of coding becomes a characteristic of the sub-band coding scheme.

In recent years, many researchers in various locations have studied the methods of preferentially coding information which is of greater visual importance, by making use of the fact that the positions and orientations of the coefficients for sub-bands are preserved and using the hierarchical relations between sub-bands. An example of the method is described in 'Embedded Image Coding Using Zerotrees of Wavelet Coefficients', IEEE Transaction on Signal Processing, Vol. 41. No.12 (1993).

The above method uses the characteristic that in almost all the cases, the coefficients of different sub-bands at the same position decrease in their magnitudes and approach zero as the band enters higher frequencies. Code words represent the relations between the hierarchical layers of these coefficients. In order to improve the efficiency of coding, it is necessary to realize distribution of coefficients which satisfy the above characteristic. Further, since the important information is coded in advance, it is possible to capture the overall image at a relatively low bit rate.

FIG. 2 shows an image coding apparatus using sub-band decomposition and FIG. 3 shows an image decoding apparatus using sub-band decomposition. Here, 1501 designates a region extracting section for extracting specific regions in the input image. When, for instance, the region of the face on the image of the visual telephone, etc., is extracted, a method as described in 'Real-Time Auto Face-Tracking System' (A study report 93-04-04 pp.13–16(1994) of The Institute of Image electronics engineers of Japan) can be used to extract the face region. Further, for an arbitrary object in a motion picture, it is possible to extract the region based on the outline of the object using the method as disclosed in Japanese Patent Application Laid-Open Hei 6 No.251,148. A reference numeral 1502 designates a sub-band decomposing section for performing sub-band decomposition through a 2-dimensional decomposing filter; 1503 designates a coding/quantizing section for coding or quantizing the data which underwent the sub-band decomposition; 1504 designates an entropy coding section which subjects the output from the coding/quantizing section to entropy coding; and 1505 designates a shape information coding section for coding the positions and shapes of the regions obtained by region extracting section 1501. The position and shape of a region will be referred to hereinbelow as shape information. An example of methods for coding shape information is chain coding in which the outline of the region is processed into codes. Designated at 1506 is a coded-data multiplexing section for multiplexing the coded data of the image and the coded data of the shape information. Here, for the process in coding/quantizing section 1503, it may perform quantization only, or may perform the DPCM as a coding scheme and then quantize the result. Alternatively, it may use vector quantization or other various schemes.

Next, in the image decoding apparatus using sub-band decomposition shown in FIG. 3, 1601 designates a coded-data demultiplexing section for demultiplexing the coded data into the coded data of the image and the coded data of the shape information; 1602 designates an entropy decoding section for subjecting the coded data of the image to entropy decoding; 1603 designates a shape information decoding section for decoding the coded data of the shape information; 1604 an inverse-quantizing/decoding section for subjecting the output from entropy decoding section 1602, to inverse quantization or decoding in the scheme corresponding to coding/quantizing section 1503; and 1605 designates a sub-band composing section for composing the sub-bands of the signals which have been inverse quantized and/or decoded, into a predetermined band. Here, coding/quantizing section 1503 and inverse-quantizing/decoding section 1604 corresponding thereto can selectively perform a scheme that is adapted to the characteristic of each of the sub-bands LL, LH, HL and HH, or can perform the same scheme for all of them.

Japanese Patent Application Laid-Open Hei 6 No.350,989 introduces a technique which allocates a greater quantity of data to a region in which an object exists (a region to be determined as important), for images which were previously decomposed into sub-bands. FIG. 4 is an example from region extracting section 1501, in which the background region and the object region are extracted from the input image. FIG. 5 shows the result of the operations in which the input image is decomposed into sub-band images corresponding to FIG. 1 by sub-band decomposing section 1502, and then each sub-band is quantized in accordance with the shape information in FIG. 4. All the regions are quantized for the sub-bands of low frequencies (LL2, HL2, LH2, HH2) on which visually important information concentrate, though in some regions, the quantization parameter may be varied. For example, the object region may be subject to a finer quantizing process than the background region, so as to achieve a more visually efficient bit allocation. For the sub-bands (HL1, LH1, HH1) for high frequencies, data is allotted to only the object region so as to perform visually efficient coding, again.

In the image coding technique aiming at a very low bit rate which has been actively studied in recent years, it is difficult to obtain a visually high quality image by only allocating different qualities of information in each of the sub-bands, of the sub-band images, by using different coding schemes. This is because in the conventional sub-band decomposing scheme, if an edge exists in the original image, high-frequency components having large amplitudes arise in the sub-band images at the locations corresponding to the edge in the original image. Therefore the information for the edge portion increases. In addition, since the allocation of information for the higher frequency components is in general less than that needed for the lower frequency components, distortion occurs around the edge in the reproduced image.

The sub-band decomposition is an overlap transform wherein the neighboring pixels in the reproduced image overlap each other. In the method in which a greater quantity of information is allotted to the sub-band images corresponding to the object region while a lower quantity of information is allotted to the sub-band images corresponding to the background region, distortion occurs again in the portion where the object adjoins the background region. For example, in the case where an original image having the shape information shown in FIG. 6(a) is coded, if a lower number of bits are allotted to the background region and a greater number of bits are allotted to the object region, distortion occurs as shown in FIG. 6(b), in the boundary portion where the object adjoins the background, thus giving a bad visual impression.

In order to solve this problem, a method by which the background and the object are totally separated can be considered. Up to now, however the sub-band decomposition/composition could be performed only for a rectangular region, and it was impossible to perform sub-band decomposition only for a specific region using shape information of an arbitrary shape.

When an image of this kind is divided into sub-bands, all obtained coefficients can be coded in some way. All these coefficients are essentially information needed in order to reproduce the original image, but all the coefficients need not be coded in order to obtain the required quality of image, especially for the low bit rate, since importance of the original information itself differs in parts.

When a motion picture is coded, in order to reduce redundancy across time, a typical technique is used in which a predictive image is formed using motion vectors and a reference image previously obtained, and its differential from the image to be coded is divided into sub-bands and then coded. Also in this case, it is not necessary to code all the coefficients obtained due to a similar reason to the above.

SUMMARY OF THE INVENTION

It is therefore an object of the present invention to solve the above problems in the conventional image coding apparatus and image decoding apparatus and to provide an image coding/decoding apparatus which is able to produce a visually high quality image at a very low bit rate.

The image coding/decoding apparatus of the invention is configured with the following features for solving the above problems.

First, the first aspect of the invention resides in an image coding/decoding apparatus for use in processing digital images, wherein an image coding apparatus comprises:

a region extracting section for extracting a plurality of regions from the image to divide the image into images for individual regions;

a shape information coding section for coding the shape information representing the positions and shapes of the individual regions;

a region dividing section for dividing the image into a plurality of rectangles each having an individual coded region;

an outer-region data extrapolating section for extrapolating the portion outside the coded region inside the rectangular region from the information within the region;

a sub-band decomposing section for decomposing the rectangular region into sub-bands;

a coding/quantizing section for coding or quantizing the sub-band images;

an entropy coding section for subjecting the output from the coding/quantizing section to entropy coding; and a coded-data multiplexing section which multiplexes the coded data of the shape information and the sub-band coded data of individual regions, and the image coding apparatus is characterized in that the rectangles, one for each region, are sub-band coded.

Next, the second aspect of the invention resides in an image coding/decoding apparatus defined in the above first feature, wherein the image coding apparatus is characterized in that the pixels which lie in each rectangle having a coded region and outside the region are extrapolated from the pixels within the coded region in the same frame.

Further, the third aspect of the invention resides in an image coding/decoding apparatus defined in the above first feature, wherein the image coding apparatus is characterized in that the pixels which lie in each rectangle having a coded region and outside the region are extrapolated from the pixels within the coded region corresponding to those in the previously coded frame.

Next, the fourth aspect of the invention resides in an image coding/decoding apparatus defined in the above first feature, wherein an image decoding apparatus for decoding the coded data which was produced by the image coding apparatus comprises:

a coded-data demultiplexing section for demultiplexing the coded data into sub-band coded data for individual regions and coded data of the shape information;

a shape information decoding section for decoding the data of the shape information;

an entropy decoding section for entropy decoding the coded data for individual regions;

an inverse-quantizing/decoding section for inverse quantizing or decoding the data which was entropy decoded;

a sub-band composing section for sub-band composing the output from the inverse-quantizing/decoding section into a predetermined band; and an image composing section for producing a reproduction image by composing the output images, for two or more regions, from the sub-band composing section, based on the shape information, and the decoding apparatus is characterized in that a reproduction image is decoded from the sub-band decomposed images for individual regions.

Moreover, the fifth aspect of the invention resides in an image coding/decoding apparatus comprising an image coding apparatus and an image decoding apparatus, wherein the image coding apparatus comprises:

a region extracting section for extracting a plurality of regions from the image to divide the image into images for individual regions;

a shape information coding section for coding the shape information representing the positions and shapes of the individual regions;

a region dividing section for dividing the image into a plurality of rectangles each having an individual coded region;

an outer-region data extrapolating section for extrapolating the portion outside the coded region inside the rectangular region from the information within the region;

a sub-band decomposing section for decomposing the rectangular region into sub-bands;

a coding/quantizing section for coding or quantizing the sub-band images;

an entropy coding section for subjecting the output from the coding/quantizing section to entropy coding; and a coded-data multiplexing section which multiplexes the coded data of the shape information and the sub-band coded data of individual regions, and the image decoding apparatus comprises:

a coded-data demultiplexing section for demultiplexing the coded data into sub-band coded data for individual regions and coded data of the shape information;

a shape information decoding section for decoding the data of the shape information;

an entropy decoding section for entropy decoding the coded data for individual regions;

an inverse-quantizing/decoding section for inverse quantizing or decoding the data which was entropy decoded;

a sub-band composing section for sub-band composing the output from the inverse-quantizing/decoding section into a predetermined band; and an image composing section for producing a reproduction image by composing the output images, for two or more regions, from the sub-band composing section, based on the shape information, the coding/decoding apparatus, further comprising: a coefficient selecting means which, for the transform coefficients for each shape information, selects coefficients required for reconstructing the transform coefficient at the time of decoding, in response to the request by the user; and a coefficient reconstructing means which reconstructs all the transform coefficients from these coefficients.

Further, the sixth aspect of the invention resides in an image coding/decoding apparatus defined in the above fifth feature, comprising: a coefficient selecting means which decomposes the image having any of the coded regions in the rectangle, into a multiple number of bands by sub-band decomposition, and selectively codes only the coefficients for each band, of the portion corresponding to the coded region, or only the coefficients for each band, of the enlarged portion of the coded region.

Furthermore, the seventh aspect of the invention resides in an image coding/decoding apparatus defined in the above fifth feature, wherein at the time of decoding, the selected and coded coefficients are reconstructed by extrapolating the required coefficients for inverse transform with a certain specific value.

Moreover, the eighth aspect of the invention resides in an image coding/decoding apparatus defined in any one of the above first through seventh features, wherein the above process written in each feature is applied to a motion-picture predictive coding scheme in which redundancy of a plurality of continuous image frames across time is reduced by coding the differential information between the continuous image frames.

The configurations of the image coding/decoding apparatus of the invention having each feature described above, are summarized as follows:

(1) It includes: a region extracting means for extracting a plurality of regions from the image to divide the image into images for individual regions; a shape information coding means for coding the shape information representing the positions and shapes of the individual regions; a region dividing means for dividing each region into a plurality of rectangles each having the coded region; an outer-region data extrapolating means for extrapolating the portion outside the coded region inside the rectangular from the information within the region; a sub-band decomposing means for decomposing the image into sub-bands; a coding/quantizing means for coding or quantizing the sub-band images; an entropy coding means for subjecting the output from the coding/quantizing means to entropy coding; and a coded-data multiplexing means which multiplexes the coded data of the shape information and the coded data of individual regions in the sub-band images.

(2) In the above (1), it has means of extrapolating the pixels which lie in each rectangle having a coded region and outside the region from the pixels within the coded region in the same frame.

(3) In the above (1), it has means of extrapolating the pixels which lie in each rectangle having a coded region and outside the region from the pixels within the coded region corresponding to those in the previously coded frame.

(4) It includes: a coded-data demultiplexing means for demultiplexing the coded data into the coded data for sub-band images and the coded data of the shape information; a shape information decoding means for decoding the data of the shape information; an entropy decoding means for entropy decoding the coded data of the image; an inverse-quantizing/decoding means for inverse quantizing or decoding the data which was entropy decoded; a sub-band composing section for sub-band composing the output from the inverse-quantizing/decoding section into a predetermined band; and an image composing means for producing a reproduction image by composing the output images, for two or more regions, from the sub-band composing section, based on the shape information.

(5) In the above (1), it includes: a selecting means which decomposes a plurality of images into sub-bands and selects only coefficients of higher importance as the coded coefficients for reconstructing a region; and a coefficient reconstructing means which, at the time of decoding, reconstructs the coefficients using those selected.

(6) In the above (1), it includes: a coefficient selecting means which selects the coefficients corresponding to the region to be coded, or the coefficients corresponding to the enlargement of the region.

(7) In the above (1), it includes: a means which performs extrapolation using the determined values from the selected coefficients to reconstruct the coefficients which are sub-band decomposed.

(8) In the above (1), it includes: a means for adapting the above processes (1) through (7) to motion-picture predictive coding.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIG. 4 is a conceptual view showing an example of shape information.

FIG. 5 is an illustrative view showing an example of sub-band coding using conventional shape information.

FIGS. 6(a) and (b), hereinafter referred to as FIG. 6, are conceptual views showing an example of a problem in a conventional scheme.

FIGS. 8(a)–(f) illustrates the region division and the extrapolation of the invention.

FIGS. 10(a) and (b) are block diagrams showing a configuration of an outer-region data extrapolating section of the invention.

FIGS. 11(a)–(d), hereinafter referred to as FIG. 11, are illustrative views showing a process of a mean value computing section of the invention.

FIGS. 12(a) and (b), hereinafter referred to as FIG. 12, are illustrative views showing the process of a block extrapolating section of the invention.

FIGS. 13(a) and (b) block diagrams showing a configuration of an outer-region data extrapolating section of the invention.

FIGS. 14(a)–(h), hereinafter referred to as FIG. 14, are illustrative views showing a process of a mean value computing section of the invention.

DESCRIPTION OF THE EMBODIMENT OF THE INVENTION

The embodiment of the image coding apparatus and image decoding apparatus of the invention will be described in detail with reference to the accompanying drawings.

Figure 1:
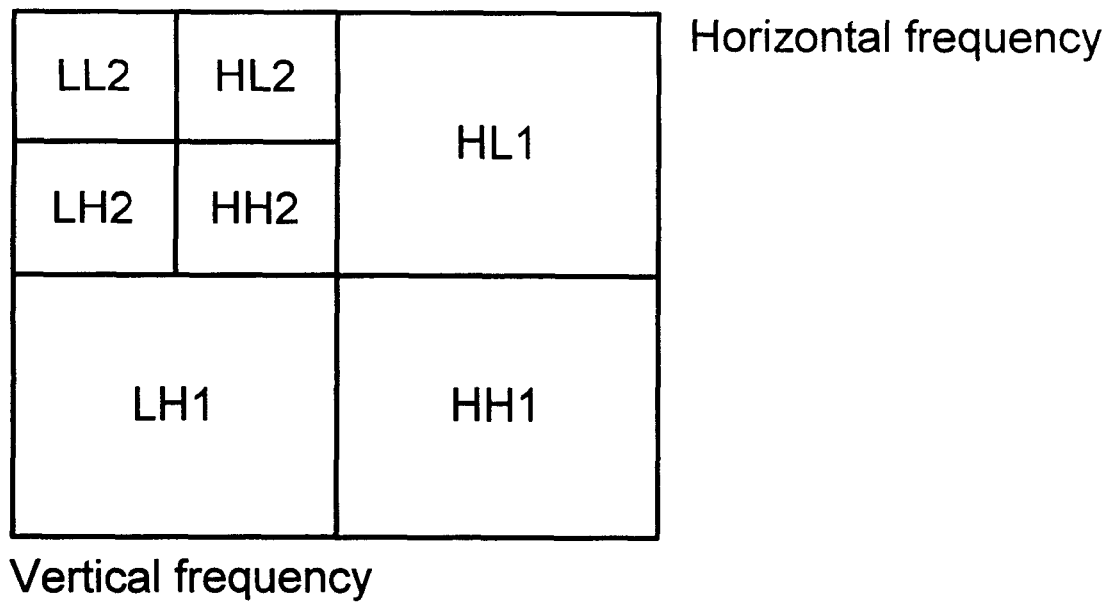
FIG. 1 is a conceptual view showing a sub-band image obtained through a conventional sub-band filter bank.
Figure 2:
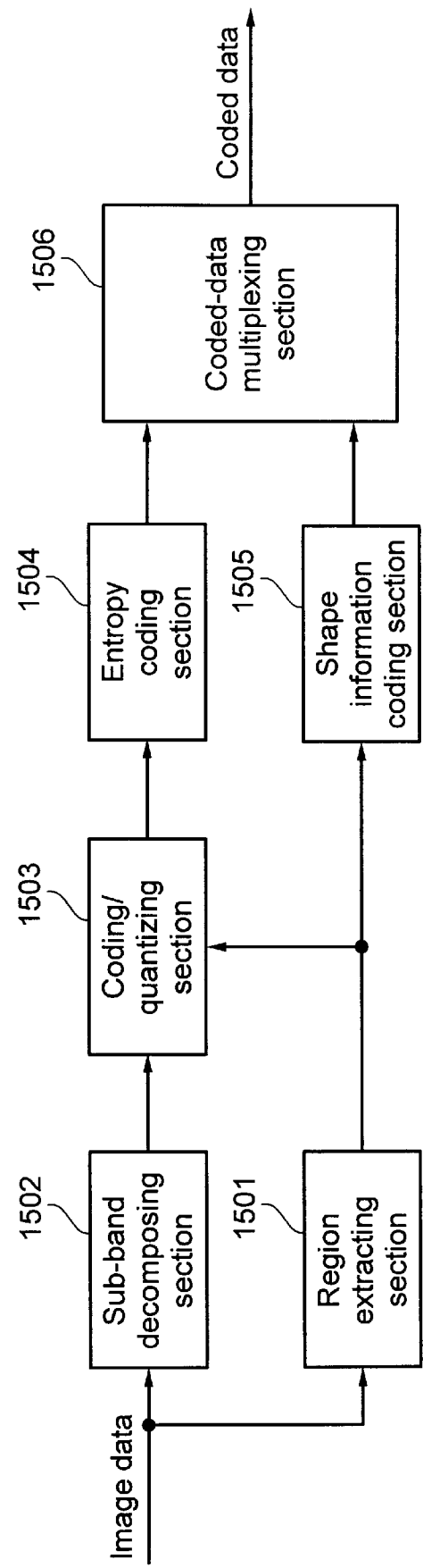
FIG. 2 is a block diagram showing a configuration of a conventional image coding apparatus.
Figure 7:
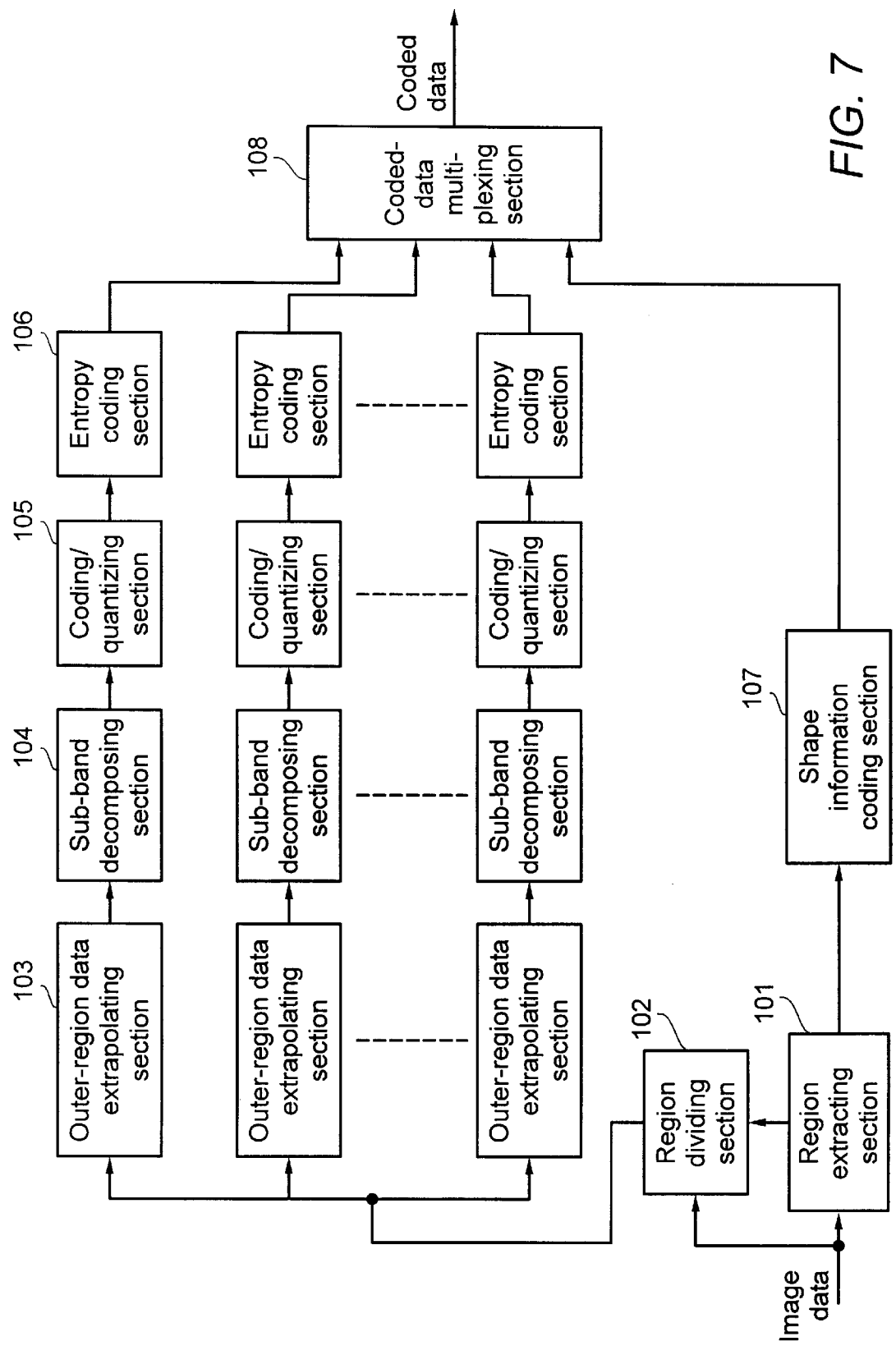
FIG. 7 is a block diagram showing a configuration of an image coding apparatus in the invention.

FIG. 7 is a block diagram showing a coding apparatus in an embodiment of the invention. In FIG. 7, 101, 104, 106, 107 and 108 designate the same components as designated by 1501, 1502, 1504, 1505 and 1506 in FIG. 2. Designated at 101 is a region extracting section for extracting a specific region in the input image; 104 is a sub-band decomposing section for performing sub-band decomposition through a 2-dimensional decomposing filter; 106 is an entropy coding section which makes the data which was previously coded or quantized, undergo entropy coding; 107 is a shape information coding section for coding the shape information obtained through region extracting section 101; and 108 is a coded-data multiplexing section for multiplexing the coded data of the image and the coded data of the shape information.

Designated at 102 is a region dividing section for dividing the input image into region extracted data using the shape information obtained in region extracting section 101. For example, the output from region extracting section 101 is the image which is divided into the background and the object as shown in FIG. 8. In this example, the object is a person. FIG. 8(c) shows the extracted data of the background region which is obtained by allocating the pixel values of the input image to the portions corresponding to the background region alone in FIG. 8(a) whilst resetting the pixel values in the portion other than the background. FIG. 8(e) shows the extracted data of the object region which is obtained by allocating the pixel values of the input image to the portion corresponding to the object region alone in FIGS. 8(a) and (b) whilst resetting the pixel values in the portion other than the object. Here, the size of the extracted data of the object region can be assumed to be a circumscribed quadrangle of the object region. However, it is convenient that the size of blocks, if block division is made in the following process, is made to a multiple of the size of the block containing the above circumscribed quadrangle. The example shown in FIG. 8(b) is the case in which only one object exists. If there are a multiple number of objects, it is also possible to prepare plural sets of region extracted data corresponding to the objects by repeating the above procedure for each of the object regions.

Designated at 103 is an outer-region data extrapolating section for extrapolating the portion where pixel values were reset to 0, based on the region extracted data for each region obtained in region dividing section 102. For example, in the extracted data of the background region of FIG. 8(c), the pixel values outside the background are reset to 0. This portion is estimated from values of the surrounding pixels in the background, thus an extrapolated image for the background as shown in FIG. 8(d) is obtained. Similarly, in the extracted data of the object region of FIG. 8(e), the pixel values outside the object are reset to 0. This portion is estimated from values of the surrounding pixels in the object region, thus an extrapolated image for the object as shown in FIG. 8(f) is obtained. Since the data outside a region is formed using values of the surrounding pixels in the region, there is little difference between the pixel values inside and outside the region, so that no edge will characteristically occur. The method for estimating and extrapolating the information of the outside region will, in detail, be described later.

Designated at 105 is a coding/quantizing section for quantizing or coding the result which was obtained by decomposing the extrapolated image formed in outer-region data extrapolating section 103, into sub-bands. Here, since sub-band images are formed for each region, it is not necessary to allocate bits in different manners within the same sub-band image based on the shape information, as has been performed in coding/quantizing section 1503 in the conventional example shown in FIG. 2, though different coding or quantization schemes may still be used for different sub-band images.

To summarize the above: the input image is divided into a multiple number of images, one for each region; for each image, the portion other than the region in the image is extrapolated; the thus extrapolated image is decomposed into sub-bands; and the sub-band decomposed images are coded or quantized so that the coded data for all the images is output together. Thus, separate images for different regions are formed so that each image is processed separately, whereas in the conventional method, different processes were performed for different regions within one image. In this case, since information outside the region for each image is formed from the peripheral data inside the region, no edge will arise, unlike the conventional process in which all the regions were processed within a single image. Thus it is possible to suppress the generation of high-frequency components.

Figure 3:
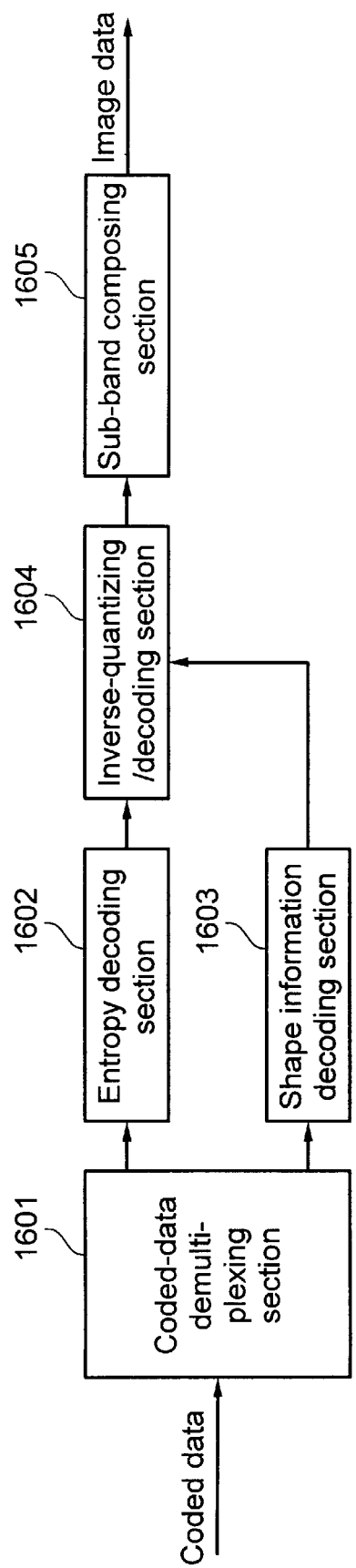
FIG. 3 is a block diagram showing a configuration of a conventional image decoding apparatus.
Figure 9:
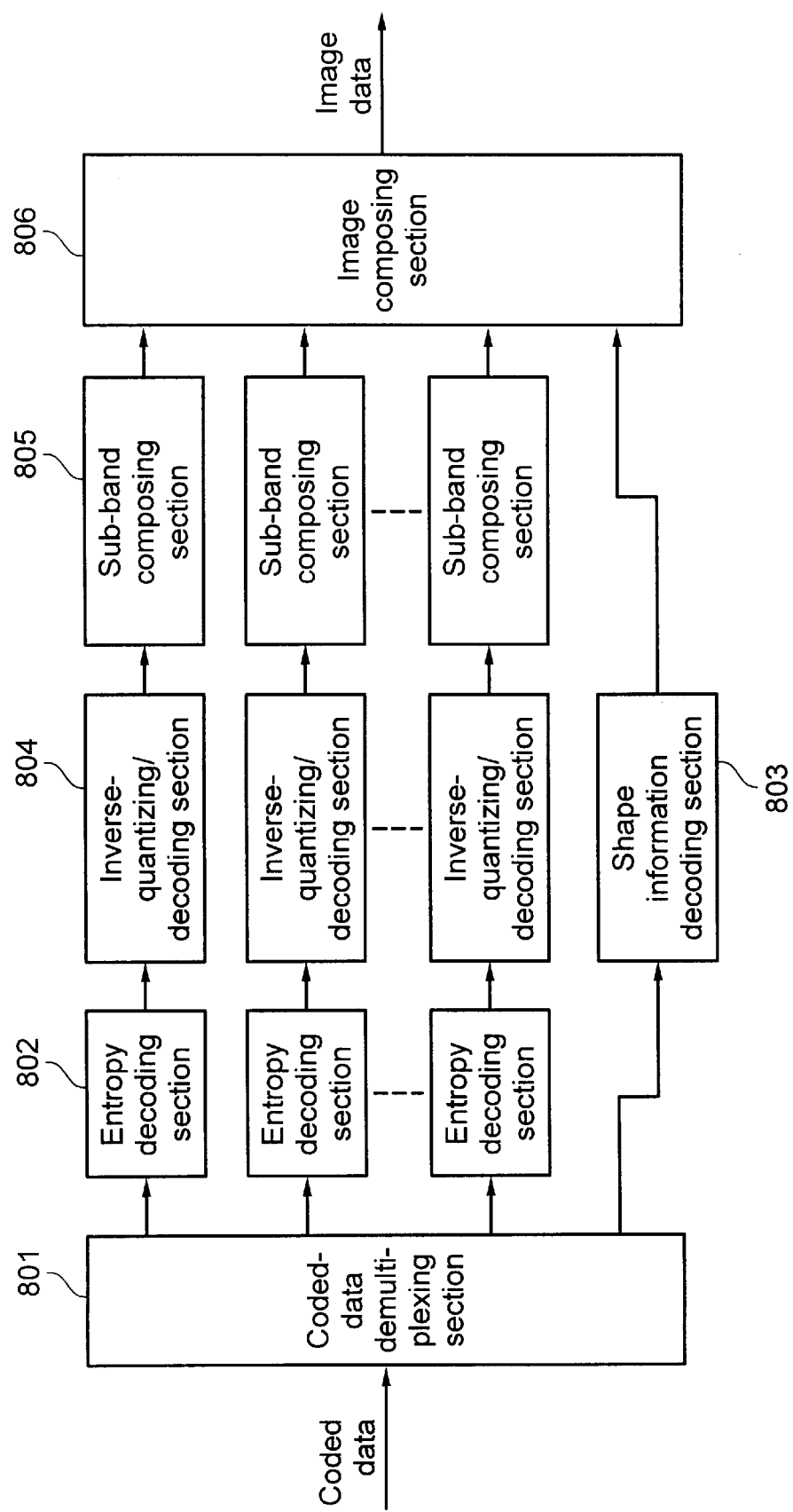
FIG. 9 is a block diagram showing a configuration of an image decoding apparatus in the invention.

Next, referring to FIG. 9, an image decoding apparatus in the embodiment of the invention will be described. In FIG. 9, 801, 802, 803 and 805 designate the same components as designated by 1601, 1602, 1603 and 1605 in FIG. 3. Designated at 801 is a coded-data demultiplexing section for demultiplexing the coded data into that of the image and that of the shape information; 802 is an entropy decoding section for performing entropy decoding; 803 is a shape information decoding section for decoding the shape information; and 805 is a sub-band composing section for composing the sub-band decomposed images.

Designated at 804 is an inverse-quantizing/decoding section for subjecting the output from entropy decoding section 802, to inverse quantization or decoding in the manner corresponding to the process performed in coding/quantizing section 105 in FIG. 7. In this case, however, since sub-band images were formed for each region on the coder side, it is not always necessary to use the shape information, unlike inverse-quantizing/decoding section 1604 in the conventional example.

Designated at 806 is an image composing section for composing a single reproduction image using the extrapolated images for each region which were reproduced in sub-band composing section 805 and the shape information which was decoded in shape information decoding section 803. For example, when the reproduced images of an extrapolated image for the background of FIG. 8(d) and an extrapolated image for the object of FIG. 8(f) were obtained with the shape information of FIG. 8(b), the section 805, in accordance with the shape information, cuts out only the portion corresponding to the background region from the extrapolated image for the background and cuts outs only the portion corresponding to the object region from the extrapolated image for the object so as to put the two regions thus cut together, based on the shape information. Although in the above, the case of one object was described, the same process can be made also in the case where a plurality of objects exist.

In this way, the data which was coded using the sub-band images formed for each region on the coder side, are used on the decoder side to make reproductions for each region and obtain the single reproduction image using the shape information.

FIG. 10 is a block diagram for explaining outer-region data extrapolating section 103 in the embodiment of the invention. In FIG. 10, 201 designates a block-dividing section for dividing the shape information and the region extracted data obtained in region dividing section 102 of FIG. 7, into blocks. Designated at 202 is a mean value computing section for determining the mean value for the pixels inside a block using shape information. Now, the region for an object will be exemplified for the explanation. When the extracted data of the object region shown in FIG. 11 is divided into blocks, the blocks turn out to be classified into three types: 1) the block which consists of the object region only; 2) the block which consists of the region other than the object region (that is, the block which only has the pixel values reset or set at 0); and 3) the block which includes both the object region and the other region. For the blocks of 1), no extrapolating process is needed. For the blocks of 3), mean value computing section 202 calculates the mean value of the pixel values in the object based on the corresponding shape information, and allocates the mean value to the pixels outside the object.

Designated at 203 is a block extrapolating section which determines, for a block of type 2), the mean value of the blocks adjacent thereto, and allots the mean value to the subject block. Similarly to mean value computing section 202, the region for an object will be exemplified for the explanation. Since in a block of type 2), no pixel has a pixel value representing the object therein, the pixel values inside the block are calculated using the values of the surrounding blocks. For example, in FIG. 12, the white blocks are of type 2). When eight blocks around an observed block are examined and of these there is any block of type 1) or any block of type 3) which underwent the mean value allocation, the mean value of the blocks is allotted to the observed block. If the eight blocks around the observed block are all of type 3), the operation goes to the next block without performing anything. This operation is repeated throughout one frame of the image, and if there are still any unprocessed blocks of type 3), the aforementioned operation is performed once again. When every block of type 3) is allotted with its mean value of the blocks therearound, the operation is ended. In this way, the pixels outside the object region can be allotted with values which are very close to the pixel values inside the object region.

Thus, the execution of the above process enables an extrapolated image to be formed from region extracted data. Since data outside a region is determined from the mean values of the surrounding data inside the region, variations between the pixel values inside and outside the region are small so that no edge will appear. Accordingly, generation of high-frequency components in the sub-band images can be suppressed, thus making it possible to eliminate the deformation due to quantization.

FIG. 10(b) is a configuration in which the output from FIG. 10(a), or the portion outside the region in the extrapolated image is subjected to a low-pass filtering process. That is, a filtering section designated at 204 cancels the gap which would remain at the boundary between blocks when the data is subjected to the mean value process for each block, so that the portion outside the region in the extrapolated image can be smoothened more.

In the above example, the mean values of the surrounding pixel values inside the region are allotted to the portion outside the region in the extrapolated image, but methods other than this can also be used to determine the pixel values outside the region.

FIG. 13 is another block diagram for explaining outer-region data extrapolating section 103 in the embodiment of the invention. In FIG. 13, 401 and 405 designate the same components as designated by 201 and 203 in FIG. 10. Designated at 401 is a block dividing section; and 405 is a block extrapolating section.

Designated at 402 is a motion vector detecting section which compares the region extracted data of the current frame with the region extracted data of the frame which has been previously coded for each block so as to determine the motion vector of the current frame relative to the previously coded frame.

Designated at 403 is a motion compensating section which forms a predictive image from the previously coded frame, based on the motion vector which was determined in motion vector detecting section 402.

Designated at 404 is a mean value processing section which is identical with the one designated at 202 of FIG. 10. In FIG. 10, it calculates the mean of the pixel values in a region of the current frame, whereas in FIG. 13, it calculates the mean of the pixels in a region of the predictive image of the previously coded frame which was determined in motion compensating section 403 and corresponds to an observed block in the current frame. When the region is assumed to be of an object, as shown in FIG. 14, the portion other than the object in the current frame is allotted with the mean value of the pixel values of the object in the previously coded frame.

Thus, the execution of the above process enables an extrapolated image to be formed from region extracted data. Since data outside a region is determined from the mean values of the data inside the region of the predictive image, variations between the pixel values inside and outside the region are small so that no edge will appear. Accordingly, generation of high-frequency components in the sub-band images can be suppressed, thus making it possible to eliminate the deformation due to quantization. Further, when this method is applied to the motion picture and the difference between the current frame and the predictive frame is calculated, it is possible to prevent the occurrence of extra predictive errors in the portion outside the region.

FIG. 13(b) is a configuration in which the output from FIG. 13(a), or the portion outside the region in the extrapolated image is subjected to a low-pass filtering process. That is, a filtering section designated at 406 cancels the gap which would remain at the boundary between blocks when the data is subjected to the mean value process for each block, so that the portion outside the region in the extrapolated image can be smoothened more.

Figure 15:
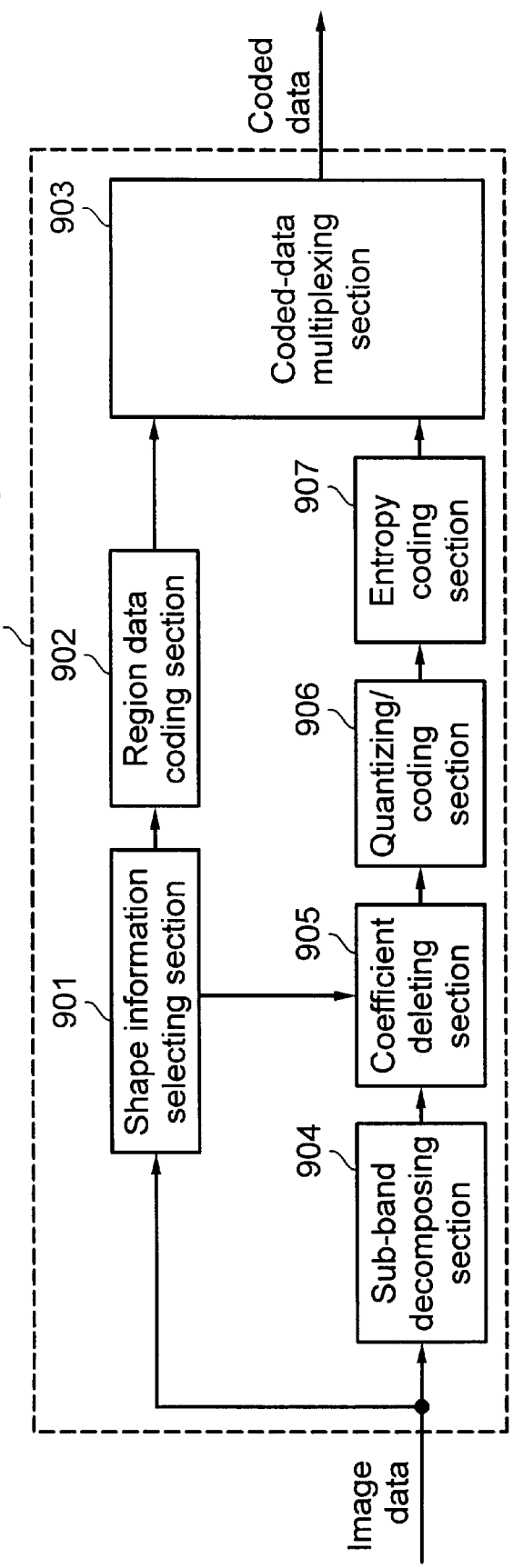
FIG. 15 is a block diagram showing an embodiment of an image encoding apparatus in accordance with another configuration of the invention.

FIG. 15 is a block diagram showing another configuration of the coding apparatus, elements 900–907. In the figure, a 'shape information selecting section' 901 extracts a specific region that is selected from the original image and determines the size of the region to be coded.

In the same figure, a 'coefficient deleting section' 905 is the section which deletes unnecessary coefficient information based on the boundary information obtained in 'shape information selecting section' 901. The scheme for the deletion depends on the techniques used in a 'quantizing section' 906 in the same figure and a 'coding section' 907 in the same figure. For example, when the aforementioned ZeroTree is used, the coefficients are replaced simply with zero. It is also possible to use a method whereby the region to be deleted is removed from the operating range of the coefficients to be coded. Here, the image to be input may be the image data or the differential image between the predictive image and the original image.

Figure 16:
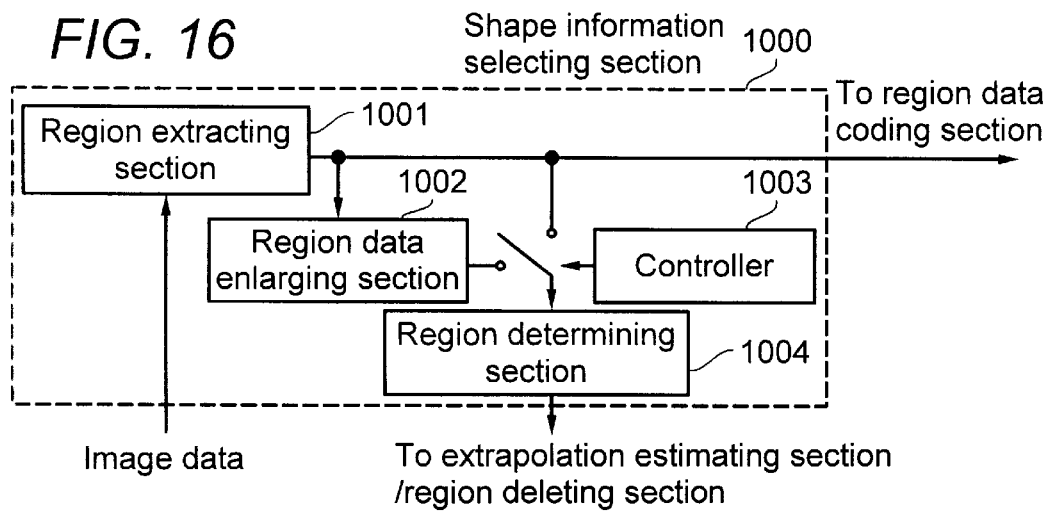
FIG. 16 is a block diagram showing an 'shape information selecting section' in FIG. 15, in a more detailed manner.

FIG. 16 is a diagram showing in detail, 'shape information selecting section' 901 of FIG. 15. In this figure, a 'region extracting section' 1001 is the section which extracts a region of an arbitrary shape that is selected from the image data. In the same figure, a 'region data enlarging section' 1002 is the section which enlarges the shape information obtained. The original shape information and this enlarged shape information are selected at a 'controller' 1003 in the same figure so that a final coding region is determined at a 'region determining section' 1004.

Figure 17:
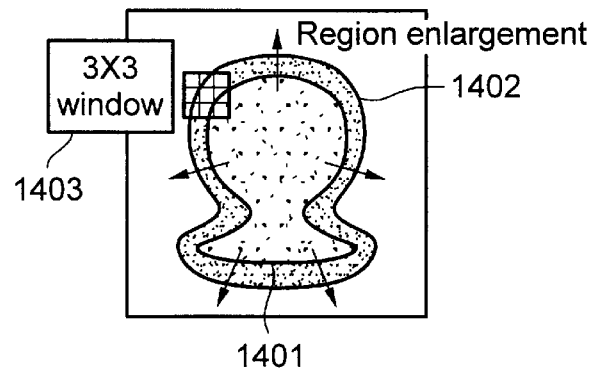
FIG. 17 is a view showing the way of enlarging an image representing original boundary information.
Figure 18:
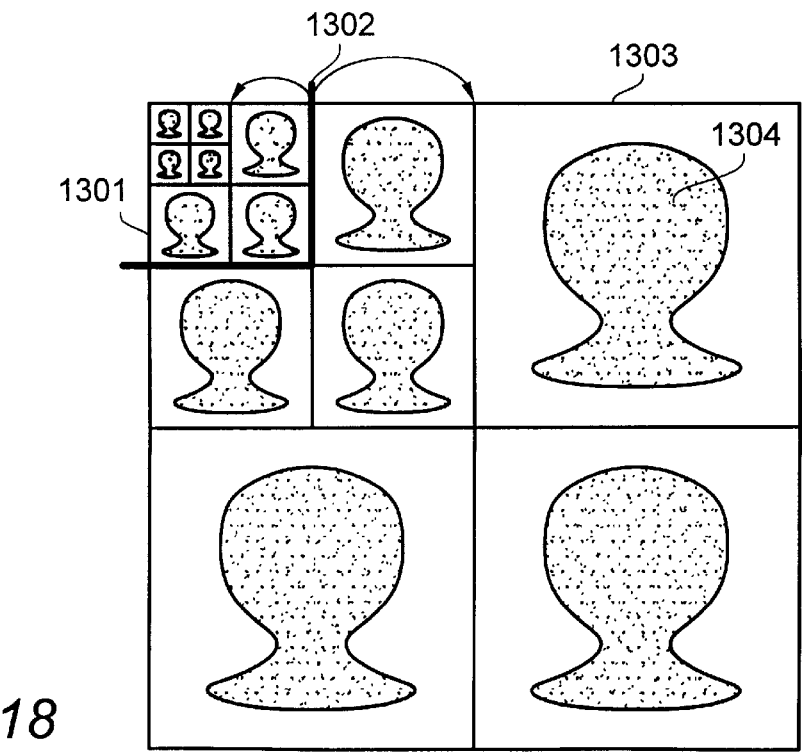
FIG. 18 is a schematic diagram showing the portions of coefficients to be coded in individual bands which are sub-band decomposed.

A 'shape information selecting section' 1000 can select a region to be coded, based on the quality of image to be required and the amount of codes to be required. As a technique for the selection, it is possible to use one or combination of the technique using the enlargement or reduction of the previous region of a shape and the technique whereby the selection region is changed depending on each of the bands. Specifically, as shown in FIG. 17, the region to be coded is enlarged so that the enlarged region 1402 is used for coding, in place of the original region 1401. As a method for enlargement, if the boundary information is represented as vector information, the length of the vectors may be appropriately increased, or the OR-operation in a '3×3 window' 1403 in the figure may be repeatedly made. The shape information to be coded is limited to the region 1401. Next, as for the coefficients which have been decomposed into sub-bands, the regions of different sizes are arranged within one frame, are as shown in FIG. 18. In this arrangement, a rule is made such that all coefficients which belong to the bands lower than a certain partition 1302 between sub-bands should be totally coded whereas as for the coefficients which belong to the bands higher than the partition, only those hatched, 1304 should be coded. In this way, an appropriate region can be determined by shifting partition 1302 between bands.

Figure 19:
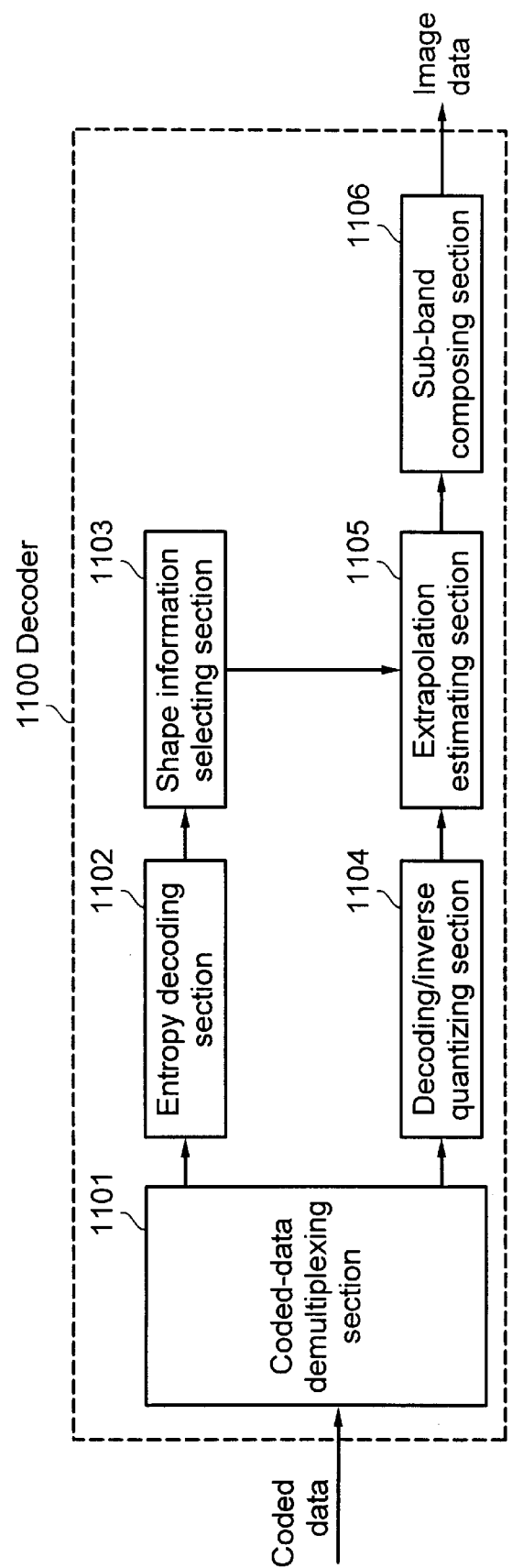
FIG. 19 is a block diagram showing an embodiment of an image encoding apparatus in accordance with another configuration of the invention.

Next, description will be made of a motion picture decoding apparatus. FIG. 19 is a block diagram showing another configuration of the decoding apparatus elements 1100–1106. A 'shape information selecting section' 1103 in the figure is the section which selects the coefficients to be coded based on the shape information which was acquired in a similar manner to that performed at the time of coding: the coder and decoder should select the same region.

An 'extrapolation estimating section' 1105 in the figure is the section which compensates the loss of coefficients other than the those obtained by decoding. Thus, the reconstructed image can be obtained at a 'sub-band composing section' 1106. When an actual image is constructed, it is possible to configure an object of an arbitrary shape by omitting the outside of the reconstructed region obtained at the 'region selecting section' in the figure.

Figure 20:
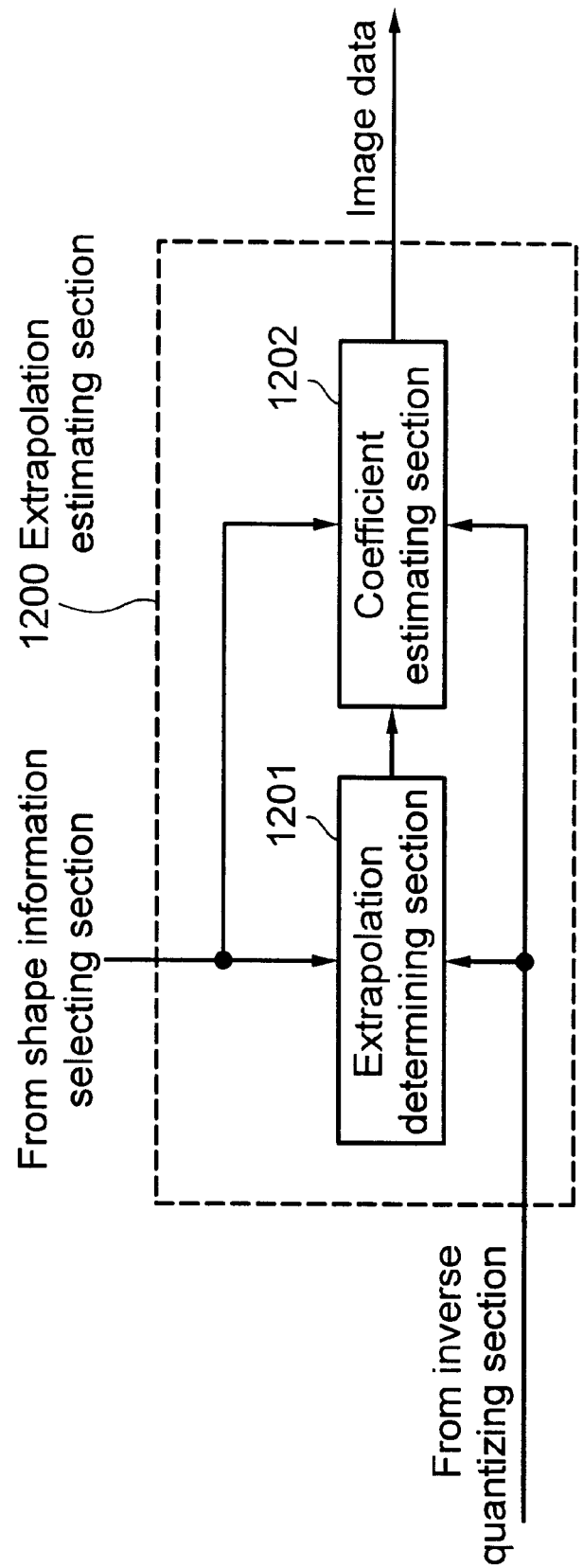
FIG. 20 is a block diagram showing an 'extrapolation estimating section' in FIG. 19, in a more detailed manner.

FIG. 20 is a diagram showing 'extrapolation estimating section' 1105 in FIG. 19, in a more detailed manner. Using coefficients which are inverse quantized and the selected shape information, an 'extrapolation determining section' 1201 determines a value to be extrapolated. Using this value, a 'coefficient estimating section' 1202 in the figure estimates the coefficients outside the selected region. A method of determining the value to be extrapolated can be to make a calculation of the mean value of the coefficients corresponding to the region concerned. As other methods, the values to be extrapolated may be allotted simply with zeros, since the coefficients to be extrapolated are, in particular, of little importance for constituting the reconstructed values.

In the way described above, a multiple number of extrapolated images are formed by dividing the image using its shape information and extrapolating the divided images, and for these extrapolated images, the coefficients are decimated to be coded or quantized appropriately. Thus it is possible to provide an image coding/decoding apparatus which can offer a visually high quality image at a very low bit rate.

In the image coding/decoding apparatus of the invention, the image is divided into rectangles, one for each region, which each have the coded region based on the shape information. The portion outside the coded region is extrapolated with the information within the region, thereby eliminating the edge between the regions and inhibiting the generation of high frequency components. Thus, it is possible to prevent generation of the deformation at the edge due to quantization.

In the image coding/decoding apparatus of the invention, the image is divided into rectangles, one for each region, which each have the coded region based on the shape information. The portion outside the coded region is extrapolated with the information within the region, thereby making it possible to produce a rectangle corresponding to a region of an arbitrary shape. Thus, it is possible to perform sub-band decomposition and composition of only the specific region of an arbitrary shape.

In the image coding/decoding apparatus of the invention, the image for each region is decomposed into sub-bands, which are then quantized/coded. An image is composited from the reproduction of the thus processed data, based on the shape information. Therefore, since the result of the sub-band codes for a certain region will not affect the quality of the reproduced image of another region, it is possible to prevent generation of the deformation caused when the reproduced image of the background region of low quality affects the object region adjacent to the background, and thereby it is possible to prevent degradation of the visual characteristics.

In the image coding apparatus of the invention, since the portion other than the coded region within the rectangle which has the coded region therein is extrapolated by computing the mean values of the neighboring data inside the region, it is possible to smooth the boundary between the regions, whereby generation of high frequency components can be inhibited.

In the image coding apparatus of the invention, since the portion other than the coded region within the rectangle which has the coded region therein is extrapolated by computing the mean values of the data inside the region in the previously coded frame corresponding to the rectangle, it is possible to prevent the occurrence of erroneous information of the portion other than the region inside the circumscribed quadrangle when the inter-frame coding is effected.

In accordance with the image coding/decoding apparatus of the invention, it is possible to achieve high efficiency coding without degrading the visual quality, by appropriately selecting the information of the transformed coefficients and coding it. Particularly, in the case of coding at a low bit rate, a slight improvement of the coding efficiency will exert a great influence upon the overall quality, therefore the overhead which arises when a multiple number of images are overlapped, can be suppressed to the minimum, thus making it possible to improve the overall quality of image. Also for predictive errors across time which arise when a multiple number of objects are separately coded and laid over, the present invention can suppress the overhead to the minimum, thus making it possible to similarly improve the overall quality of image.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An image decoder, comprising:

a coded-data demultiplexing section for demultiplexing sub-band coded-data of sub-band images decomposed from regions of an extracted and divided image;

an entropy decoding section for decoding the sub-band coded-data;

an inverse-quantizing/decoding section for inverse quantizing/decoding the entropy decoded data to produce a first output;

a sub-band composing section for sub-band composing the first output to produce a second output of images; and an image composing section for producing a reproduction image by composing the images from the second output.

2. An image decoder according to claim 1, further comprising a shape information decoding section for decoding shape information coded-data.

3. An image decoder according to claim 2, wherein the image composing section produces a reproduction image by composing images from the second output which are based on shape information decoded from the shape information decoding section.

4. An image decoding apparatus, comprising:

a coded-data demultiplexing section for demultiplexing sub-band coded-data and shape information coded-data received from an image coding apparatus;

an entropy decoding section for decoding the sub-band coded-data;

a shape information decoding section for decoding shape information coded-data;

an inverse-quantizing/decoding section for inverse-quantizing/decoding the entropy decoded data to produce a first output;

a sub-band composing section for sub-band composing the first output to produce a second output of images; and an image composing section for producing a reproduction image by composing images from the second output, wherein the images are based on decoded shape information.

5. A method of decoding for use in processing digital images, comprising:

receiving shape information coded-data and sub-band coded data from individual coded regions extracted from an image;

demultiplexing the sub-band coded-data and shape information coded-data;

entropy decoding the sub-band coded-data;

shape information decoding the shape information coded-data;

inverse-quantizing/decoding the entropy decoded data to produce a first output;

sub-band composing the first output to produce a second output of images; and producing a reproduction image by composing images from the second output, wherein the images are based on decoded shape information.

6. An image decoding apparatus, comprising a coded-data demultiplexing section for demultiplexing coded data, wherein the coded-data comprises shape information coded data for each individual region of a plurality of regions extracted from image data, and sub-band coded data for each individual region of the plurality of regions extracted from image data;

a shape information decoding section for decoding coded data of the shape information for each individual region of the plurality of regions demultiplexed by said coded-data demultiplexing section;

an entropy decoding section for entropy decoding the sub-band coded-data for each individual region of the plurality of regions demultiplexed by said coded-data demultiplexing section;

an inverse-quantizing/decoding section for inverse quantizing or decoding the individual entropy decoded data decoded by said entropy decoding section;

a sub-band composing section for sub-band composing the output from said inverse-quantizing/decoding section; and an image composing section for producing a reproduction image by composing images for the plurality of regions, which are output from the sub-band composing section for each individual region of the plurality of regions, and which are based on the shape information for each individual region of the plurality of regions decoded by said shape information decoding section.

7. An image decoder, comprising:

a coded-data demultiplexing section for demultiplexing sub-band coded-data of sub-band images decomposed from regions of an extracted and divided image, and for demultiplexing shape information coded-data, said sub-band and shape information coded-data received from an image coder;

an entropy decoding section for decoding the sub-band coded-data;

an inverse-quantizing/decoding section for inverse quantizing/decoding the entropy decoded data to produce a first output without influence by said shape information;

a sub-band composing section for sub-band composing the first output to produce a second output of images; and an image composing section for producing a reproduction image by composing the images from the second output.

8. An image decoding apparatus, comprising:

a coded-data demultiplexing section for demultiplexing sub-band coded-data and shape information coded-data received from an image coding apparatus;

an entropy decoding section for decoding the sub-band coded-data;

a shape information decoding section for decoding shape information coded-data;

an inverse-quantizing/ decoding section for inverse-quantizing/decoding the entropy decoded data to produce a first output;

a sub-band composing section for sub-band composing the first output to produce a second output of images; and an image composing section for producing a reproduction image by composing images from the second output, wherein the images are based on decoded shape information received directly from the shape information decoding section.

9. A method of decoding for use in processing digital images, comprising:

receiving shape information coded-data and sub-band coded data from individual coded regions extracted from an image;

demultiplexing the sub-band coded-data and shape information coded-data;

entropy decoding the sub-band coded-data;

shape information decoding the shape information coded-data;

inverse-quantizing/decoding the entropy decoded data to produce a first output;

sub-band composing the first output to produce a second output of images; and producing a reproduction image by composing images from the second output, wherein the images are based on decoded shape information directly received.

10. An image decoding apparatus, comprising a coded-data demultiplexing section for demultiplexing coded data, wherein the coded-data comprises shape information coded data for each individual region of a plurality of regions extracted from image data, and sub-band coded data for each individual region of the plurality of regions extracted from image data;

a shape information decoding section for decoding coded data of the shape information for each individual region of the plurality of regions demultiplexed by said coded-data demultiplexing section;

an entropy decoding section for entropy decoding the sub-band coded-data for each individual region of the plurality of regions demultiplexed by said coded-data demultiplexing section;

an inverse-quantizing/decoding section for inverse quantizing or decoding the individual entropy decoded data decoded by said entropy decoding section;

a sub-band composing section for sub-band composing the output from said inverse-quantizing/decoding section; and an image composing section for producing a reproduction image by composing images for the plurality of regions, which are output from the sub-band composing section for each individual region of the plurality of regions, and which are based on the shape information for each individual region of the plurality of regions decoded by said shape information decoding section, said image composing section receiving decoded shape information directly from said shape information decoding section.

* * * * *